Dec. 11, 1934. G. B. SHAW ET AL 1,984,038
ELECTRICAL CABLE AND CORD
Filed May 20, 1933  2 Sheets-Sheet 1
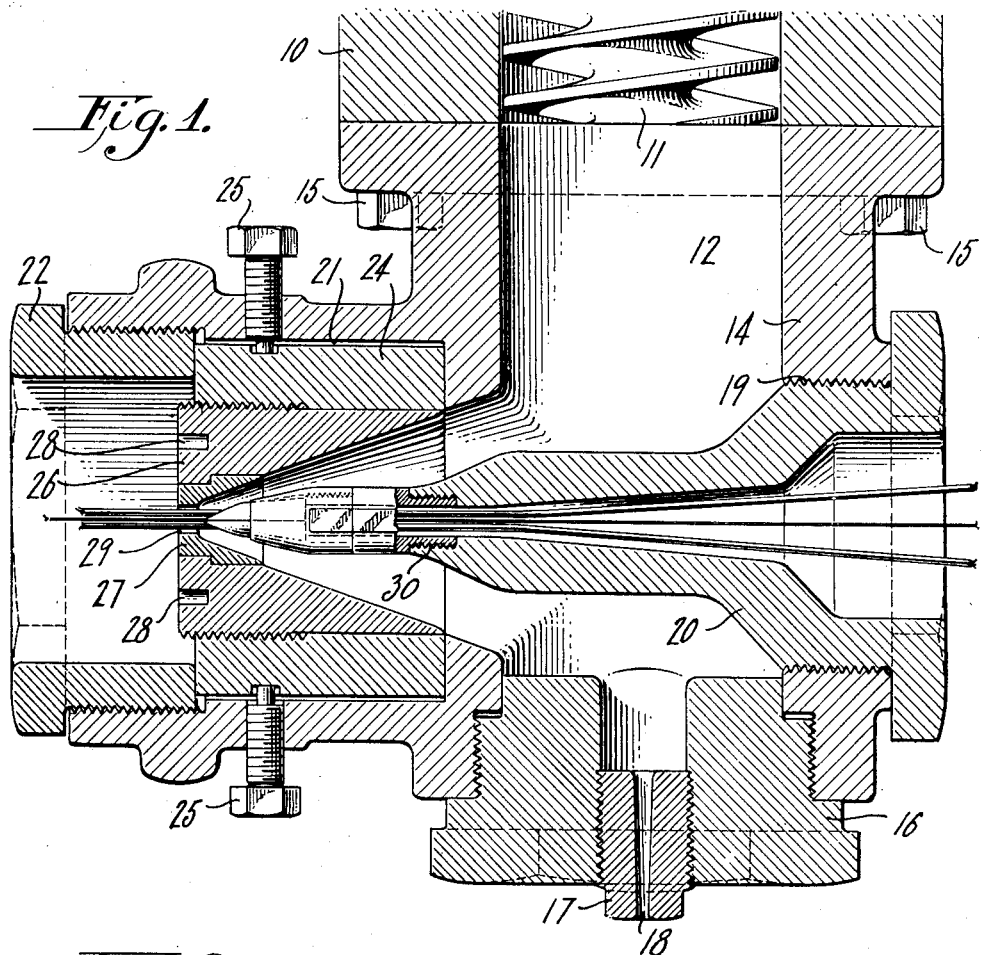
Fig. 1.
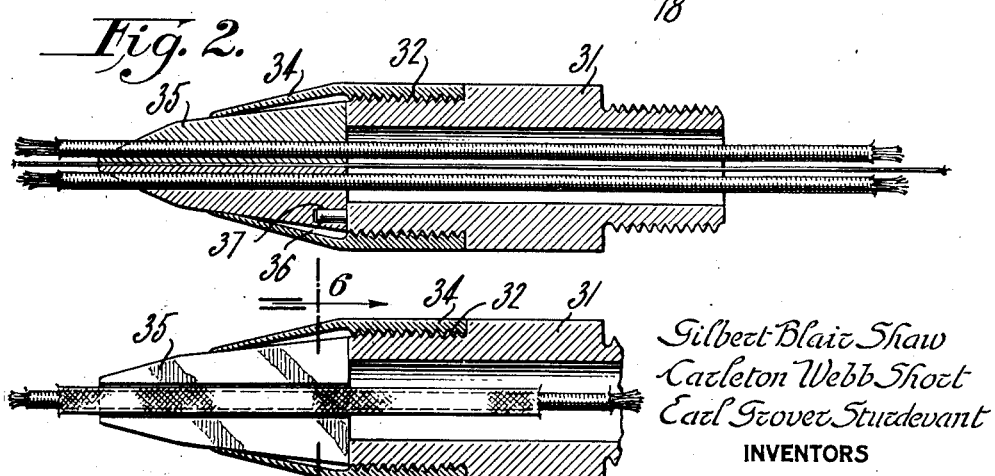
Fig. 2.
Fig. 3.
Gilbert Blair Shaw
Carleton Webb Short
Earl Grover Sturdevant
INVENTORS
BY
ATTORNEY Dec. 11, 1934.    G. B. SHAW ET AL    1,984,038
ELECTRICAL CABLE AND CORD
Filed May 20, 1933    2 Sheets-Sheet 2
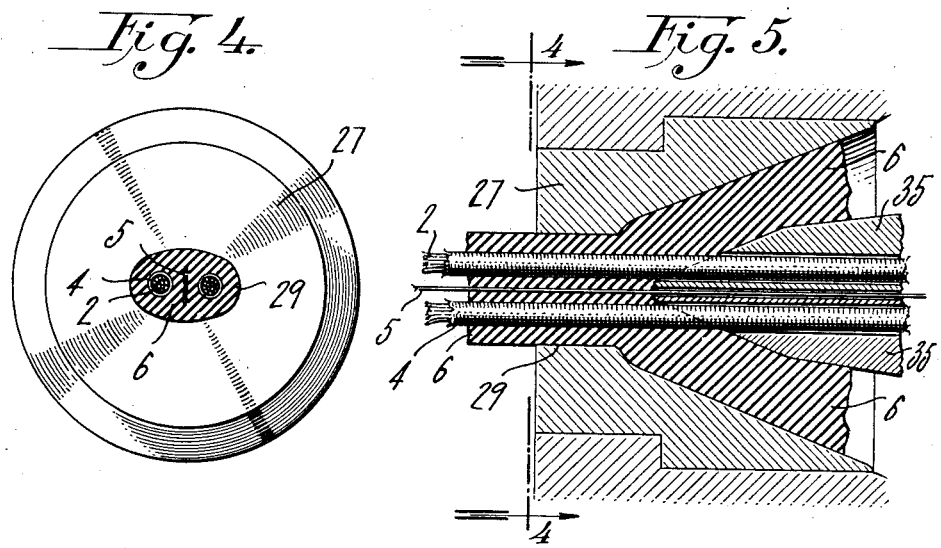
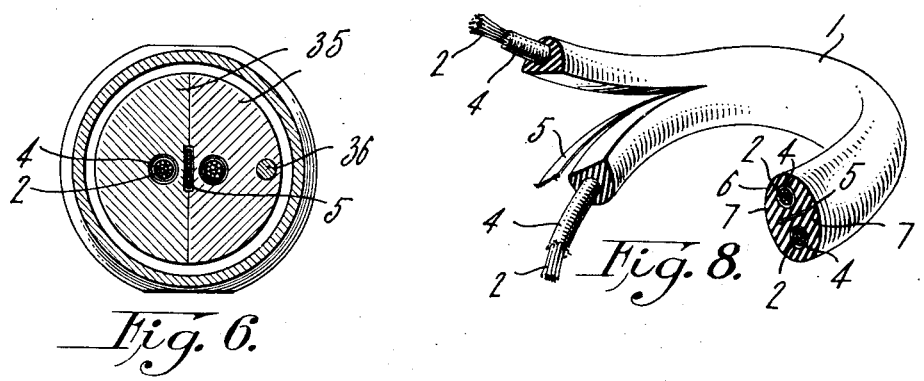
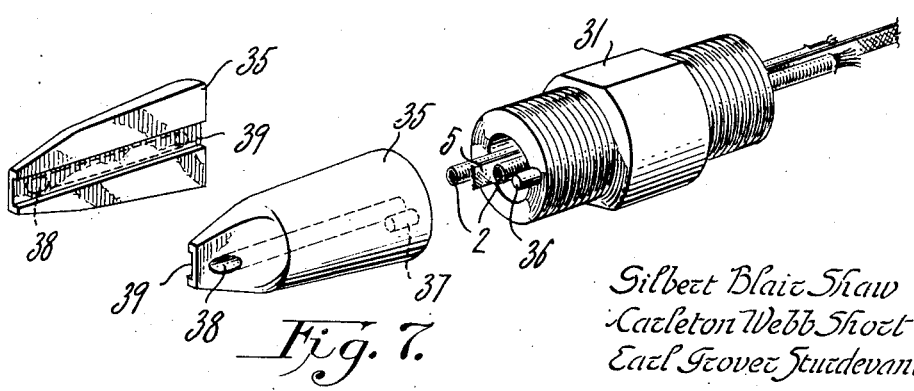
Gilbert Blair Shaw
Carleton Webb Short
Earl Grover Sturdevant
INVENTORS
BY
ATTORNEY Patented Dec. 11, 1934

1,984,038

UNITED STATES PATENT OFFICE 1,984,038

ELECTRICAL CABLE AND CORD

Gilbert B. Shaw and Earl G. Sturdevant, Bristol, and Carleton W. Short, East Providence, R. I., assignors, by mesne assignments, to United States Rubber Company, New York, N. Y., a corporation of New York Application May 20, 1933, Serial No. 671,982

8 Claims. (Cl. 173—264)

Our invention relates to electrical cables and cords and methods and apparatus for making the same. More particularly our invention relates to electrical cables and cords in which at least a pair of metallic electrical conductors are embedded in a single body of insulating material. For the purpose of making electrical connections with cables and cords it is necessary to separate the conductors for a short distance at the ends thereof. This may be done by pulling the conductors and tearing the intermediate insulating material, or it may be done by cutting the insulating material. In either event, however, the insulating material intermediate the conductors is unequally distributed with resulting non-uniformity in electrical resistance.

We provide a multi-conductor cable or cord in which a plurality of conductors are embedded in insulating material and an electrically inert strip is embedded in the insulating material between the conductors without being bonded thereto. When it is desired to separate the conductors, they are pulled apart and the insulating material, which is usually rubber, detaches itself from the strip without tearing thereby preserving a uniform distribution of insulating material between the separated conductors.

The width of the strip is such that the insulating material on opposite sides of it flows around the edges of the strip and is joined to make a unitary multiple-conductor cable. The insulating material at the edges of the strip is torn when the conductors are separated, but the cross sectional area of these portions of the insulating material is relatively small and their rupture does not materially affect the insulating material immediately surrounding the conductors so as to impair its electrical resistance.

Multiple-conductor cable or cords embodying our invention may be made by passing a pair of electrical conductors and an interposed strip of electrically inert material through a die in an extruding or tubing machine. The shape of the die is such as to control the amount of insulating material usually of rubber, which is placed around the conductors and at the same time the amount of insulating material between each of them and the strip is controlled.

The accompanying drawings illustrate a present preferred embodiment of multiple-conductor cable or cord and apparatus for and methods of making the same, in which Figure 1 is a longitudinal cross sectional view of a tubing or extruding machine illustrating the application of insulating material to a pair of parallel conductors and an interposed strip;

Fig. 2 is an enlarged, horizontal, sectional view of the guide;

Fig. 3 is a plan view, in section, of a portion of the guide;

Fig. 4 is a face view of the die looking in the direction of the arrows 4—4 in Fig. 5;

Fig. 5 is an enlarged, horizontal, sectional view showing the conductors and strip in the guide with insulating material surrounding them and filling the die;

Fig. 6 is a cross sectional view of the guide taken on the section line 6—6 of Fig. 3;

Fig. 7 is an exploded view of the guide; and

Fig. 8 is a perspective view of a portion of the finished cable showing a complete section of the cable and the separation of the conductors at one end.

Referring particularly to Fig. 8, a multiple-conductor cable or cord 1 embodying our invention comprises parallel extending electrical conductors 2 having one or more servings of cotton or other thread 4 and a strip or tape 5 interposed between the conductors 2. The conductors 2 and the tape 5 are embedded in a body 6 of insulating material which holds the conductors in parallel relation and gives the cable a uniform shape and size. The width of the insulating material 6 along the medial plane of the cable is greater than the width of the strip 5 so that portions 7 of the insulating material are disposed beyond the edges of the tape 5 and serve as bonds between the insulating material on opposite sides of the strip 5.

While various types of material may be used for the insulating material 6, we find that rubber or rubber compounds are particularly suitable for the purpose of this invention, since rubber or rubber compounds are particularly adapted to be applied to the conductors by an extruding or tubing machine. The strip or tape 5 has characteristics such that it will not form a fast bond with the insulating material and, at the same time, it should not be a conductor of electricity but should be electrically inert. A number of ends of cotton thread suitably bonded into a tape are suitable. Other fibrous tapes, cellophane, paper, varnished cambric, non-adhesive substances such as talc powder, and the like, may also be used.

When it is desired to separate the conductors 2 for the purpose of making an electrical connection, they are pulled apart as shown at the left hand side of Fig. 8. When the conductors are separated the strips 7 at the edges of the strip 5 are severed and the insulating material pulls away from the opposite faces of the strip 5, thereby leaving equal depths of insulating material on the side of each of the conductors 2 adjacent to the strip 5.

Referring particularly to Fig. 1, a conventional extruding or tubing machine 10 is provided with a worm 11 for forcing insulating material, usually rubber, into a passageway 12 in a crosshead 14. The crosshead 14 is secured to the tubing machine by bolts 15. The passageway 12 continues through the crosshead and is closed at one end by a cap 16 having a plug 17 provided with a perforation 18 which serves as a bleeder for the insulating material.

At one side of passageway 12 there is an opening 19 in which is fitted a guide holder 20. At the opposite side of the passageway 12 there is an opening 21. This is closed by a threaded sleeve 22, the inner end of which bears against a chuck 24. The position of the chuck 24 may be controlled by set screws 25 for centering a die mounted therein. A die holder 26 is threaded into the interior of the chuck 24 for supporting a die 27, particularly shown in Fig. 5. The die holder 26 is provided with holes 28 for the reception of suitable tools for positioning it. The die 27 is provided with an opening 29, particularly shown in Figs. 4 and 5, through which the conductors 2 and the strip 5 are drawn while being covered with the insulating material 6. The shape of the die opening 29 determines the external configuration of the cable or cord 1.

The guide holder 20 is hollow and is reduced in diameter at its forward end where it is provided with a seat 30. A guide tube 31 is mounted in the seat 30. The tube 31 projects into the opening in the die 27. At its forward end the guide tube 31 is provided with a threaded shoulder 32 for the reception of a clamping sleeve 34. The clamping sleeve 34 fits over and engages tapered guide blocks 35 so as to hold them rigidly in engagement with the tube 31. The position of the guide blocks 35 may be controlled by dowel pins 36 mounted in the tube 31 and projecting into openings 37 in the guide blocks.

As particularly shown in Fig. 7, each of the guide blocks 35 is provided with a passageway 38 for the passage of one of the conductors 2 and a channel 39. The channels 39 when brought face to face form a passageway for the strip 5. It is to be understood that the guide blocks 35 may be made integral if desired, but, for ease in threading the tape 5, separable guide blocks are preferable. The openings of the guide blocks 35 are positioned adjacent to the die opening 29 as shown in Figs. 1 and 5.

In operating this apparatus the conductors are fed through the guide holder 20, through the passageways 38 and through the die opening 29. Similarly the tape 5 is fed through the guide holder 20, the channels 39 and the die opening 29. As the conductors and tape are drawn forward, the worm 11 is operated to force insulating material around the conductors and the tape and outwardly through the die opening 29 as shown in Fig. 5. As the cable emerges from the die opening it is of the desired cross sectional contour and may be passed directly to vulcanizing apparatus, or it may be coiled and subsequently vulcanized. Also, if desired the cable may be subsequently covered with braid and/or armor, although this is not necessary as the insulating material after wiring may be left exposed.

In use the strip 5 serves to relieve the conductors 2 of some of the longitudinal stress to which such electrical cables and/or cords are frequently subject. As the cable or cord has a uniform cross section it can be used in conduits or in fixture work. Because of the ease of separation of the conductors, electrical connections are easily made.

While we have shown and described a present preferred embodiment of a multiple-conductor cable or cord, and apparatus and method of making the same, it is to be understood that the invention may be otherwise embodied and other apparatus used and methods practiced in its manufacture and within the scope of the appended claims.

Having thus described our invention, what we claim and desire to protect by Letters Patent is:

1. An electrical cable or cord having a plurality of electrical conductors embedded in and entirely surrounded by a unitary body of insulating material in predetermined spaced-apart relation, a stratum of different electrically non-conducting material substantially symmetrically disposed within the insulating material separating a pair of electrical conductors and equi-distantly spaced therefrom, said stratum being of substantially less dimension in a plane passing through said pair of electrical conductors than in a plane at right angles thereto whereby separation of the electrical conductors is facilitated without loss of their coatings of insulating material.

2. An electrical cable or cord having a plurality of electrical conductors embedded in a unitary body of insulating material in predetermined spaced-apart relation, a strip of different electrically non-conducting material entirely embedded in the insulating material separating any two electrical conductors, and substantially equi-distantly spaced therefrom, said strip being disposed in a plane at substantially right angles to a plane passing through the two electrical conductors whereby separation of the electrical conductors without substantial loss of resistance in their coatings of insulating material is facilitated.

3. An electrical cable or cord having a pair of electrical conductors embedded in a unitary body of insulating material in predetermined spaced-apart relation, a strip of different flexible electrically non-conducting material embedded in the insulating material separating said pair of electrical conductors, and substantially equi-distantly spaced therefrom, and lying in a plane substantially at right angles to a plane containing said pair of electrical conductors whereby separation of the pair of electrical conductors without substantial loss of resistance in their coatings of insulating material is facilitated.

4. An electrical cable or cord having a pair of electrical conductors embedded in a unitary body of insulating material in predetermined spaced-apart relation, a strip of different flexible electrically non-conducting material embedded in the insulating material separating said pair of electrical conductors, and substantially equi-distantly spaced therefrom, and lying in a plane substantially at right angles to a plane containing said pair of electrical conductors, the thickness of the insulating material between said strip and each of the electrical conductors being substantially the same as the thickness of insulating material on the opposite and outsides of said electrical conductors whereby separation of the pair of electrical conductors is facilitated.

5. An electrical cable or cord having a pair of electrical conductors embedded in a unitary body of insulating material in predetermined spaced-apart relation, a strip of flexible electrically non-conducting material non-adhesively embedded in said insulating material between and substantially equi-distantly spaced from said pair of electrical conductors and lying in a plane substantially at right angles to a plane containing said pair of electrical conductors, the edges of said strip terminating in proximity to the outer surface of said insulating material to form connecting walls of insulating material across the edges of the strip, whereby separation of the pair of electrical conductors without substantial loss of electrical resistance in their coatings of insulating material is facilitated.

6. An electrical cable or cord having a pair of electrical conductors embedded in a unitary body of rubber composition in predetermined spaced-apart relation, a strip of flexible, non-rubber, and electrically non-conducting material embedded in said rubber composition between and substantially equi-distantly spaced from said pair of electrical conductors and extending in a direction substantially at right angles to a plane containing said pair of electrical conductors, the thickness of the rubber composition between said strip and each of the electrical conductors being substantially the same as the thickness of the rubber composition on the opposite and outsides of said electrical conductors, the edges of said strip terminating in proximity to the outer surface of said rubber body to form connecting walls of rubber composition across the edges of the strip, whereby separation of the pair of electrical conductors without substantial loss of their electrical insulating coatings is facilitated.

7. An electrical cable or cord having a pair of electrical conductors embedded in a unitary body of insulating material in predetermined spaced-apart relation, a strip of flexible non-conducting material non-adhesively embedded in said insulating material between and substantially equidistantly spaced from said pair of electrical conductors and lying in a plane substantially at right angles to a plane containing said pair of electrical conductors, the edges of said strip terminating in proximity to the outer surface of said insulating material to form connecting walls of insulating material across the edges of the strip, whereby separation of the pair of electrical conductors without substantial loss of electrical resistance in their coatings of insulating material is facilitated.

8. An electrical cable or cord having a plurality of electrical conductors embedded in a unitary body of rubber composition in predetermined spaced-apart relation, and a strip of different electrically non-conducting material entirely and non-adhesively embedded in the rubber body separating any two electrical conductors, and substantially equi-distantly spaced therefrom, said strip being disposed in a plane at substantially right angles to a plane passing through the two electrical conductors whereby separation of the electrical conductors without substantial loss of electrical resistance in their rubber coatings is facilitated.

GILBERT B. SHAW.
EARL G. STURDEVANT.
CARLETON W. SHORT.

CERTIFICATE OF CORRECTION.

Patent No. 1,984,038. December 11, 1934.

GILBERT B. SHAW, ET AL.

It is hereby certified that error appears in the above numbered patent requiring correction as follows: In the grant, line 5, and in the heading to the printed specification, line 7, for "corporation of New York" read corporation of New Jersey; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.